United States Patent
Gangadharaiah et al.

(10) Patent No.: US 12,197,503 B1
(45) Date of Patent: Jan. 14, 2025

(54) INTERACTIVE COMMAND GENERATION FOR NATURAL LANGUAGE INPUT

(71) Applicant: Amazon Technologies, Inc., Seattle, WA (US)

(72) Inventors: Rashmi Gangadharaiah, San Jose, CA (US); Jonathan James Pezzino, Seattle, WA (US); James W. Horsley, San Jose, CA (US); Mira E Hall, Seattle, WA (US)

(73) Assignee: Amazon Technologies, Inc.

( * ) Notice: Subject to any disclaimer, the term of this patent is extended or adjusted under 35 U.S.C. 154(b) by 195 days.

(21) Appl. No.: 17/039,933

(22) Filed: Sep. 30, 2020

(51) Int. Cl.
*G06F 16/9032* (2019.01)
*G06F 40/35* (2020.01)

(52) U.S. Cl.
CPC ........ *G06F 16/90332* (2019.01); *G06F 40/35* (2020.01)

(58) Field of Classification Search
CPC ............................ G06F 16/90332; G06F 40/35
See application file for complete search history.

(56) References Cited

U.S. PATENT DOCUMENTS

| | | |
|---|---|---|
| 5,386,556 A | 1/1995 | Hedin et al. |
| 6,665,640 B1 | 12/2003 | Bennett et al. |
| 7,640,254 B2 | 12/2009 | McConnell |
| 7,725,307 B2 | 5/2010 | Bennett |
| 8,140,556 B2 | 3/2012 | Rao et al. |
| 9,076,448 B2 | 7/2015 | Bennett et al. |
| 10,303,683 B2 | 5/2019 | Anderson et al. |
| 10,664,472 B2 | 5/2020 | Burceanu et al. |
| 10,745,886 B2 | 8/2020 | Pence et al. |
| 10,747,761 B2 | 8/2020 | Zhong et al. |
| 11,200,894 B2 * | 12/2021 | Smith ..................... G06F 3/167 |
| 11,228,573 B1 * | 1/2022 | Rangasamy ...... H04L 12/40006 |
| 2012/0253791 A1 * | 10/2012 | Heck ................... G06F 16/9535 704/9 |
| 2016/0260430 A1 * | 9/2016 | Panemangalore ...... G06F 3/167 |

(Continued)

OTHER PUBLICATIONS

Rashmi Gangadharaiah, et al., "Recursive Template-based Frame Generation for Task Oriented Dialog," Proceedings of the 58th Annual Meeting of the Association for Computational Linguistics, Jul. 2020, pp. 2059-2064.

*Primary Examiner* — Sonia L Gay
(74) *Attorney, Agent, or Firm* — Robert C. Kowert; Kowert, Hood, Munyon, Rankin & Goetzel, P.C.

(57) ABSTRACT

Methods, systems, and computer-readable media for interactive command generation for natural language input are disclosed. A natural language dialog system receives a natural language input for a dialog with a user. The system determines a state representation of the dialog based at least in part on the natural language input. The state representation indicates an operation offered by a service. The system generates a natural language output based at least in part on the natural language input. The natural language output solicits an additional natural language input for the dialog. The system determines an updated state representation of the dialog based at least in part on the additional natural language input and the state representation. The updated state representation indicates parameter value(s) for the operation. Based at least in part on the updated state representation, the system generates a command invoking the operation with the parameter value(s).

20 Claims, 12 Drawing Sheets

(56) References Cited

U.S. PATENT DOCUMENTS

| | | | | |
|---|---|---|---|---|
| 2018/0367941 | A1* | 12/2018 | Kwong | H04M 1/72403 |
| 2019/0318238 | A1* | 10/2019 | Nokbak Nyembe | G06N 5/043 |
| 2020/0175971 | A1* | 6/2020 | Arora | H04B 7/18519 |
| 2020/0374244 | A1* | 11/2020 | John | H04L 67/133 |
| 2021/0089587 | A1* | 3/2021 | Gupta | G10L 15/063 |
| 2021/0192397 | A1* | 6/2021 | Rastogi | G06F 40/20 |

\* cited by examiner

INTERACTIVE COMMAND GENERATION FOR NATURAL LANGUAGE INPUT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. As the scale and scope of distributed systems have increased, the tasks of provisioning, administering, and managing system resources have become increasingly complicated.

Figure 1:
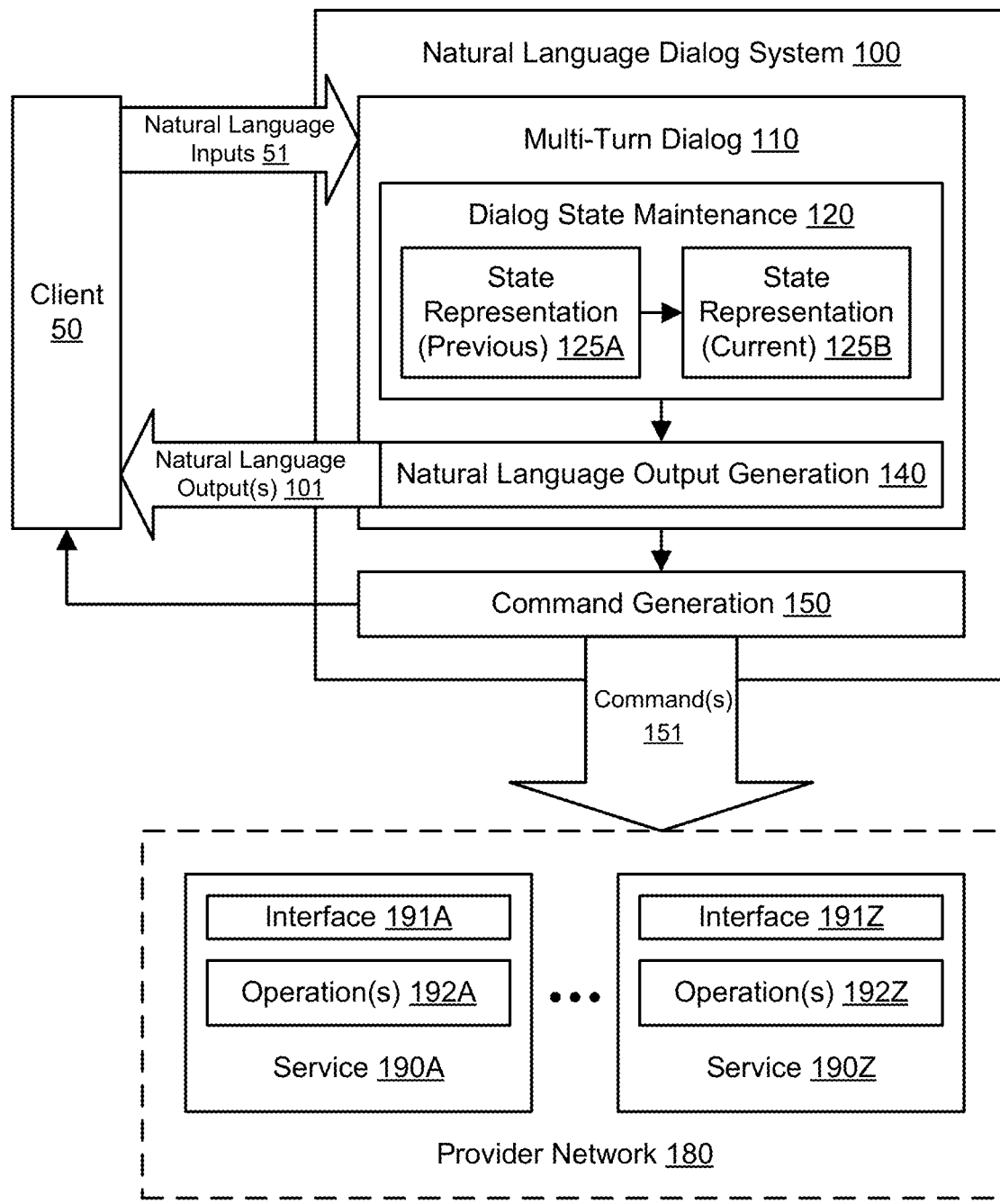
FIG. 1 illustrates an example system environment for interactive command generation for natural language input, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for interactive command generation for natural language input are described. An Internet-accessible, cloud-based provider network can offer numerous services, e.g., services that provide virtualized compute resources and virtualized storage resources for clients. Such services may offer functionality to their clients in the form of operations, e.g., operations to instantiate virtualized resources or reserve resources for clients, modify the configuration of resources, or return information about resources. An operation can be requested or invoked by providing a properly formatted command to the service, where the command indicates the operation name as well as any required parameter values (e.g., the identifier of a resource whose configuration is to be modified). In many cases, such commands are provided to a service via a command-like interface (CLI) associated with the service. The requirement to understand the syntax of these commands may pose a challenge to users, particularly users who have less experience with a service. If users are required to manually build commands that obey the formal structure required by services, then the research necessary to understand the command syntax may prove time-consuming and frustrating.

The aforementioned challenges, among others, are addressed by embodiments of the techniques described herein, whereby an automated system may build a command to invoke an operation offered by a service based (at least in part) on an interactive, multi-turn dialog with a user who provides natural language input. When users seek to perform operations in a provider network, a natural language dialog system may respond to natural language inputs from the users by generating natural language outputs such as follow-up questions. Over multiple turns in a dialog with a user, the dialog system may identify the relevant service, the operation to be performed by the service, and parameter values for the operation. For example, if the user states "I'd like to create a database instance," the dialog system may determine a relevant service name ("db-service") and a relevant operation name ("create-db-instance"), and the dialog system may ask follow-up questions to solicit parameter values from the user such as the name of the new database instance and the name of a database engine to use. From turn to turn, the dialog system may maintain and update dialog-related state information such as a state representation of the command to be built and a dialog history. The dialog system may use a machine learning model (e.g., a neural network model) to update the state representation based on the latest natural language input from the user. At or near the end of the dialog, the dialog system may generate a properly formatted command based on the state representation, thus freeing the user from the responsibility of understanding the syntax of the command.

As one skilled in the art will appreciate in light of this disclosure, embodiments may be capable of achieving certain technical advantages, including some or all of the following: (1) reducing the latency of performing operations in an Internet-accessible, cloud-based provider network by allowing users to specify such operations via natural language input instead of forcing users to learn the command syntax and manually build their commands; (2) improving the use of computing resources in an Internet-accessible, cloud-based provider network by automatically generating properly formatted commands to control those computing resources instead of processing improperly formatted commands from users; (3) improving the use of storage resources in an Internet-accessible, cloud-based provider network by automatically generating properly formatted commands to control those storage resources instead of processing improperly formatted commands from users; and so on.

FIG. 1 illustrates an example system environment for interactive command generation for natural language input, according to some embodiments. A natural language dialog system 100 may use automated techniques to build command(s) 151 based (at least in part) on an interactive, multi-turn dialog 110 with a client 50 who provides natural language inputs 51 and who does not necessarily provide a formal expression of the command(s). The client 50 may represent one or more users or a computer system or component operated by such user(s). The natural language associated with the inputs 51 may represent a language, such as English, that developed naturally among people, in contrast to an artificial language or computer language. In some embodiments, the natural language inputs 51 may include elements of an artificial language or computer language such as a structured query language or other language having a formal syntax for controlling a computer system. For example, if a user is somewhat knowledgeable about command syntax, then the natural language inputs 51 may include elements of a natural language along with more formal elements associated with a particular command. However, in circumstances where the user is unaware of command syntax, the natural language inputs 51 may exclude such formal elements. The dialog system 100 may thus implement a flexible interface for users with differing degrees of technical knowledge.

The command(s) 151 may request or invoke one or more operations offered by one or more services of a provider network 180. For example, the provider network 180 may include services 190A through 190Z. Service 190A may include an interface 191A by which clients (including the dialog system 100) can request the service 190A to perform one or more operations 192A. Similarly, service 190Z may include an interface 191Z by which clients (including the dialog system 100) can request the service 190Z to perform one or more operations 192Z. The interfaces 191A-191Z may represent one or more command-line interfaces (CLI), graphical user interfaces (GUIs), application programming interfaces (APIs), and/or other programmatic interfaces. The services 190A-190Z may represent a variety of operations 192A-192Z. For example, the services 190A-190Z may host virtualized compute resources such as virtual compute instances, virtualized storage resources such as databases and block storage, virtualized network resources such as Virtual Private Clouds, and so on. The operations 192A-192Z may include tasks to instantiate such resources, reserve the resources for use by particular clients, modify the configuration of resources, return information about the resources, and so on. For example, an operation to modify the configuration of a virtual compute instance may perform installation of software on the resource, start or stop the execution of such software, and so on. As another example, an operation to modify the configuration of a database table may change the structure of the table. Operations to modify the configurations of resources may include changing security parameters of those resources, e.g., to change the set of users that can read from or write to a resource.

The provider network 180 may represent a network set up by an entity such as a private-sector company or a public-sector organization to provide one or more services (such as various types of network-accessible computing or storage) accessible via the Internet and/or other networks to a distributed set of clients. The provider network 180 may include numerous services that collaborate according to a service-oriented architecture to provide the functionality and resources of the services 190A-190Z. The provider network 180 may include numerous data centers hosting various resource pools, such as collections of physical and/or virtualized computer servers, storage devices, networking equipment and the like, that are used to implement and distribute the infrastructure and services offered by the provider. Compute resources may be offered by the provider network 180 to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the dialog system 100 may be implemented as a service of the provider network 180, the service may be implemented using a plurality of different instances that are distributed throughout one or more networks, and each instance may offer access to the functionality of the service to various clients. Because resources of the provider network 180 may be under the control of multiple clients (or tenants) simultaneously, the provider network may be said to offer multi-tenancy and may be termed a multi-tenant provider network. The provider network 180 may be hosted in the cloud and may be termed a cloud provider network. In one embodiment, portions of the functionality of the provider network 180, such as the services 190A-190Z, may be offered to clients in exchange for fees.

In some embodiments, when a user wants to perform one or more operations 192A-192Z in the provider network 180, the user may initiate a dialog 110 with the dialog system 100. In some embodiments, the dialog system 100 may initiate the dialog 110. A user associated with the client 50 may initiate the dialog 110 by interacting with a user interface on the client 50, e.g., by entering an initial natural language input to a chatbot or other automated system that uses natural language expressions for input and output. As will be described in greater detail below, the multi-turn dialog 110 may accept natural language inputs 51 over a series of turns. The series of turns may include a plurality of turns that take place at different points in time. For one or more turns, the dialog system 100 may generate one or more natural language outputs 101 using a component for natural language output generation 140. In some embodiments, a particular turn in the multi-turn dialog 110 may be associated with a particular natural language input (e.g., an utterance including one or more words). In some embodiments, a particular turn in the multi-turn dialog 110 may be associated with a particular natural language output (e.g., an utterance including one or more words). The natural language dialog system 100 may respond to natural language inputs 51 from a client 50 by generating natural language output(s) 101 such as follow-up questions. For example, if the initial natural language input is "I'd like to create a database instance," the dialog system 100 may respond for that turn by generating a natural language output such as: "Sure. I can help you with that. What do you want as the name of the database instance?"

Over multiple turns in a dialog 110 with a user, the dialog system 100 may identify one or more relevant services, one or more operations to be performed by the service(s), and parameter values for the operation(s). For example, if the user states "I'd like to create a database instance," the dialog system 100 may determine a relevant service name ("db-service") and a relevant operation name ("create-db-instance") using that input, and the dialog system may ask follow-up questions to solicit parameter values from the user such as the name of the new database instance and the name of a database engine to use. From turn to turn in the multi-turn dialog 110, the dialog system 100 may maintain and update dialog-related state information that influences the next turn. For example, using a component for dialog state maintenance 120, the dialog system 100 may create and update a state representation expressing elements of the command to be built. As another example, the dialog system 100 may maintain a dialog history that includes natural language inputs 51. The state representation may represent a structured form of the information required to generate a command for an identified operation. In some embodiments, the state representation may include a tree-based or hierarchical data structure. In a given turn, the state representation 125A for the previous turn may be updated to the state representation 125B for the current turn, e.g., by adding one or more parameter values to complete one or more slots for corresponding parameter names.

At or near the end of the dialog 110, the dialog system 100 may use a component for command generation 150 to generate one or more properly formatted commands 151 based on the latest version of the state representation. In some embodiments, one or more of the commands 151 may be provided to the client 50, e.g., in a console or other user interface. In some embodiments, one or more of the commands 151 may be executed only after approval by the client 50. In some embodiments, one or more of the commands 151 may be executed automatically and without necessarily being approved by the client 50 after command generation. For example, the client 50 may pre-approve one or more categories of commands for automated execution. One of the command(s) 151 may indicate the name of the service, the name of the operation, and one or more parameter values for parameter names of the operation, as captured in the state representation. The parameter values may include mandatory parameter values and/or optional parameter values. In some embodiments, the dialog system 100 may send the command(s) 151 to the relevant service(s), which may then attempt to perform the requested operation(s) with the specified parameter value(s). By building properly formatted command(s) 151 based (at least in part) on natural language inputs 51, the dialog system 100 may free users from the responsibility of learning the syntax of the command(s) and thus facilitate use of the various services 190A-190Z offered by the provider network 180.

In some embodiments, a command may be generated based at least in part on state information in addition to one or more natural language inputs. For example, the dialog system 100 may maintain state information that reflects a previous interaction or set of interactions with the client 50 and/or other knowledge of the client's resources in the provider network 180. The state information may include one or more natural language inputs from a prior dialog with the client 50, one or more natural language outputs from a prior dialog, one or more previously generated commands, one or more parameter values of the client's resources, other conditions in the provider network 180, and so on. When an additional dialog is initiated by the client 50 or by the system 100 itself, the system may rely on the state information to complete a template associated with the desired command. For example, after a first natural language input that requests a particular operation at a particular service, the system 100 may derive parameter values for the command from the state information rather than soliciting the values from the client 50 using a natural language output. In some embodiments, the system 100 may generate a natural language output that confirms the operation name and one or more of the parameter values derived from the state information. Based (at least in part) on one natural language input and state information associated with the client 50, the natural language dialog system 100 may perform command generation 150 to generate one or more commands 151 with one or more parameter values.

Figure 6:
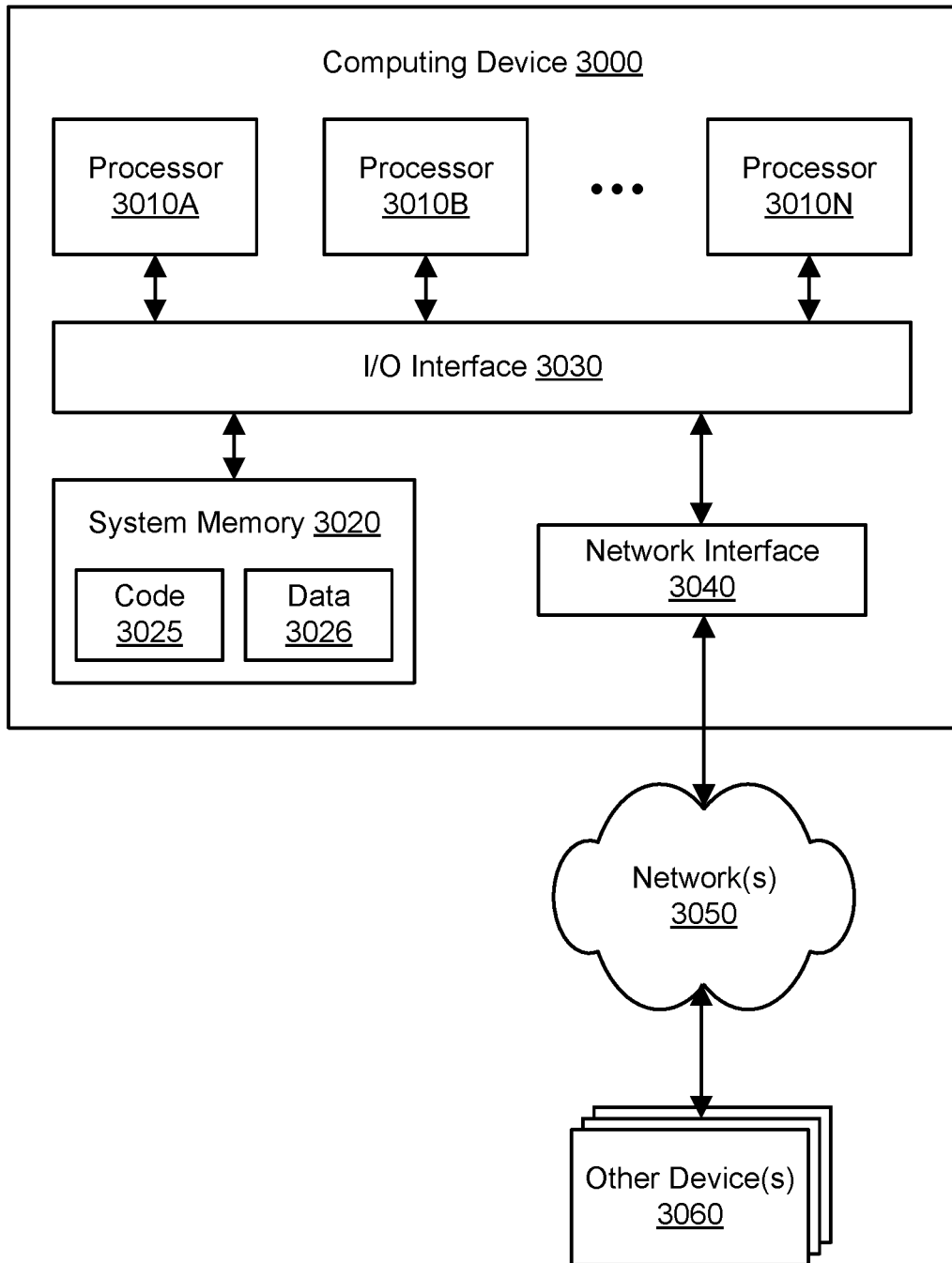
FIG. 6 illustrates an example computing device that may be used in some embodiments.

In various embodiments, components of the dialog system 100 and provider network 180 may be implemented using any suitable number and configuration of computing devices, any of which may be implemented by the example computing device 3000 illustrated in FIG. 6. In some embodiments, the computing devices may be located in any suitable number of data centers or geographical locations. In various embodiments, at least some of the functionality of the dialog system 100 may be provided by the same computing device or by different computing devices. In various embodiments, if any of the components of the dialog system 100 are implemented using different computing devices, then the components and their respective computing devices may be communicatively coupled, e.g., via one or more networks. Any of the components of the dialog system 100 may represent any combination of software and hardware usable to perform their respective functions. In some embodiments, operations implemented by the dialog system 100 may be performed automatically, e.g., without a need for user initiation or user intervention after an initial configuration stage, and/or programmatically, e.g., by execution of program instructions on at least one computing device. In some embodiments, the dialog system 100 may include additional components not shown, fewer components than shown, or different combinations, configurations, or quantities of the components shown.

A client 50 of the dialog system 100 may represent one or more computing devices, computing systems, or other components that are external to the dialog system. Client devices may be managed or owned by one or more customers or users of the dialog system 100. In one embodiment, the client devices may be implemented using any suitable number and configuration of computing devices, any of which may be implemented by the example computing device 3000 illustrated in FIG. 6. A client application, interface, or other component may run on such a device to accept natural language inputs 51 from one or more users, send the natural language inputs to the dialog system 100, receive natural language output(s) 101 from the dialog system, and provide the natural language output(s) to the client. For example, the interface may represent a chatbot that accepts natural language inputs 51 and conveys them to the dialog system 100. In some embodiments, the natural language inputs 51 may be entered by users typing the inputs, e.g., using a keyboard or touch-enabled interface. In some embodiments, the natural language inputs 51 may be entered by users selecting options in a graphical user interface (GUI). For example, the GUI may permit users to navigate a tree of common services and common operations by pushing buttons in the GUI or interacting with other GUI elements. In some embodiments, the natural language inputs 51 may be entered by users speaking utterances via a voice-enabled interface, and one or more components of the voice-enabled interface may convert the spoken-language utterances into textual representations. In some embodiments, the natural language output(s) 101 may be provided to users by displaying text on a display. In some embodiments, the natural language output(s) 101 may be provided to users via audio output of a voice-enabled interface.

A client 50 may convey network-based service requests to the dialog system 100 via one or more networks. Similarly, the dialog system 100 may convey network-based service requests to the provider network 180 via one or more networks, e.g., to obtain information about the services 190A-190Z and their operations 192A-192Z and to provide command(s) 151 to the services. The network(s) may encompass any suitable combination of networking hardware and protocols necessary to establish network-based communications between client devices and the dialog system 100 and between the dialog system and the provider network 180. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the dialog system 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the dialog system 100. In one embodiment, client devices may communicate with the dialog system 100 using a private network rather than the public Internet. In various embodiments, the various components of the dialog system 100 may also communicate with other components of the dialog system using one or more network interconnects.

Figure 2:
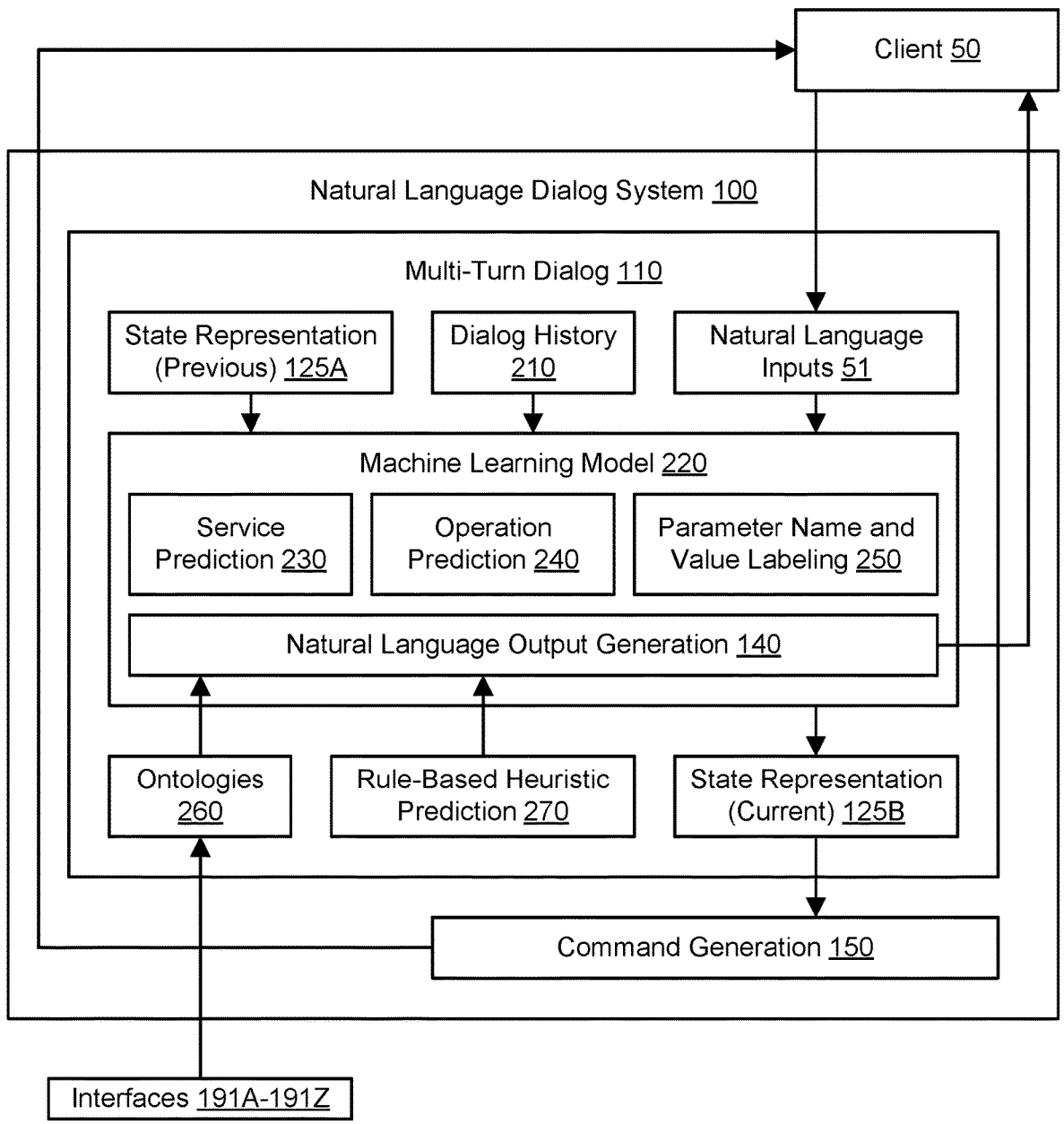
FIG. 2 illustrates further aspects of the example system environment for interactive command generation for natural language input, including a machine learning model configured to update state representations in a multi-turn dialog, according to some embodiments.

FIG. 2 illustrates further aspects of the example system environment for interactive command generation for natural language input, including a machine learning model configured to update state representations in a multi-turn dialog, according to some embodiments. As discussed above, a particular turn in the multi-turn dialog 110 may be associated with a particular natural language input and a particular natural language output. Over multiple turns in a dialog 110 with a user, the dialog system 100 may identify one or more relevant services, one or more operations to be performed by the service(s), and parameter values for the operation(s). As illustrated in FIG. 2, the dialog system 100 may use a machine learning model 220 (implemented according to one or more machine learning techniques) to process the latest natural language input, the state representation 125A from the previous turn, and the dialog history 210 in order to update the state representation and/or produce natural language output for the current turn. The dialog history 210 may include natural language inputs from prior turns. The dialog history 210 may include natural language outputs from prior turns. The dialog history 210 may include other state information, such as the configuration of the client's resources in the provider network 180. In some embodiments, the machine learning model 220 may implement service prediction 230 to identify one or more services in natural language inputs 51. In some embodiments, the machine learning model 220 may implement operation prediction 240 to identify one or more operation names in natural language inputs 51. In some embodiments, the machine learning model 220 may implement parameter name and value labeling 250 to identify one or more parameter values for parameter names in natural language inputs 51.

Machine learning techniques may be implemented using one or more systems that learn from data, identify patterns, and make predictions or other decisions with minimal human intervention (e.g., after human input during an initial configuration phase such as model training). Machine learning techniques may include generating and using one or more models that can programmatically output results (e.g., indicators of redundant logic) based (at least in part) on input (e.g., the logic itself and/or dependency relationships associated with the logic). Such a machine learning model may undergo a training process (e.g., using a training data set) such that it learns patterns sufficient to make inferences about future events. For example, the model 220 may be trained to predict service names and operation names based (at least in part) on natural language inputs 51. The machine learning model 220 may include, for example, a neural network model.

In some embodiments, the machine learning model 220 may be used to implement the natural language output generation 140. For example, the model 220 may be trained to generate natural language outputs for a given turn based (at least in part) on the previous state representation 125A, dialog history 210, and/or natural language inputs 51. In some embodiments, one or more ontologies 260 may be used to implement the natural language output generation 140. The ontologies 260 may represent properties of services and operations and the relationships between them. For example, the ontologies 260 may indicate the operations offered by a particular service. As another example, the ontologies 260 may indicate the parameter names for a particular operation. The ontologies 260 may be derived from the interfaces 191A-191Z associated with the operations 192A-192Z. In some embodiments, the ontologies 260 may use a graph-based approach in which nodes represent concepts such as services and operations, while edges represent relationships between those concepts.

In some embodiments, rule-based heuristic prediction 270 may be used to implement the natural language output generation 140. The rule-based heuristics may be used to generate natural language output based (at least in part) on navigating rule trees or other rule-based data structures. The heuristics may differ according to the nature of natural language inputs. For example, if a natural language input seems to follow at least a partial CLI syntax, the heuristics for extracting information from that input may differ from the heuristics for extracting information from a natural language input that does not seem to follow the CLI syntax. In some embodiments, an ensemble of various machine learning models and rule-based models may be used by the dialog system 100 to extract information (e.g., service names, operation names, and parameter values) from natural language inputs, generate natural language outputs, and automatically build commands 151. In some embodiments, using an ensemble approach, a combination of different machine learning models and/or rule-based models may be selected at runtime for use in generating a command. In some embodiments, one or more of the commands 151 may be provided to the client 50, e.g., in a console or other user interface. In some embodiments, one or more of the commands 151 may be executed only after approval by the client 50. In some embodiments, one or more of the commands 151 may be executed automatically and without necessarily being approved by the client 50 after command generation. For example, the client 50 may pre-approve one or more categories of commands for automated execution.

Figure 3A:
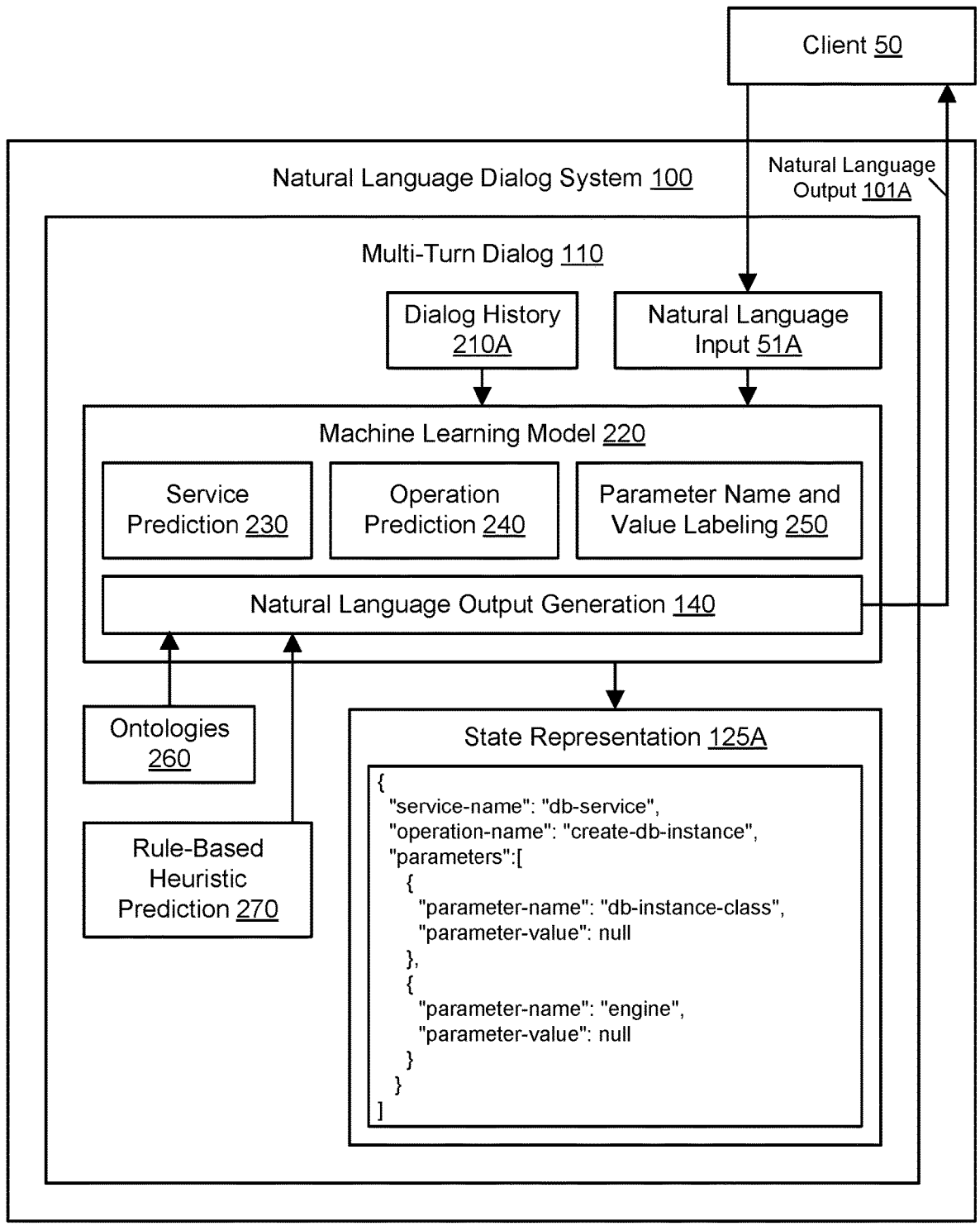
FIG. 3A, FIG. 3B, FIG. 3C, and FIG. 3D illustrate an example of interactive command generation for natural language input, according to some embodiments.

FIG. 3A, FIG. 3B, FIG. 3C, and FIG. 3D illustrate an example of interactive command generation for natural language input, according to some embodiments. As shown in FIG. 3A, a client 50 may initiate the automated building of a command in a dialog 110 using a natural language input 51A. The natural language input 51A may state: "I'd like to create a database instance." A dialog history 210A for this dialog 110 may be empty or may include prior natural language inputs. For example, if the user was uncertain as to what type of resource needed to be created, the dialog system 100 may have interacted with the user previously to present a set of options including a database instance. Based (at least in part) on the natural language input 51A and potentially on any dialog history 210A, the machine learning model 220 may use service prediction 230 to identify a likely service name ("db-service") and may use operation prediction 240 to identify a likely operation name ("create-db-instance"). The machine learning model may be used to create a state representation 125A for the desired command. The state representation 125A may include a hierarchical data structure. As shown in the example of FIG. 3A, the state representation may indicate the service name ("db-service") and the operation name ("create-db-instance"). The state representation 125A may indicate parameter names ("db-instance-class" and "engine") for the operation. However, at this point in the dialog 110, the values for those parameters may be unknown to the dialog system 100. One or more additional turns may be used to obtain the parameter values. To begin obtaining those parameter values, the natural language output generation 140 may generate a natural language output 101A that represents an acknowledgement of the service and operation and also a solicitation of a parameter value. For example, the natural language output 101A may state: "Sure. I can help you with that. What do you want as the name of the database instance?"

Figure 3B:
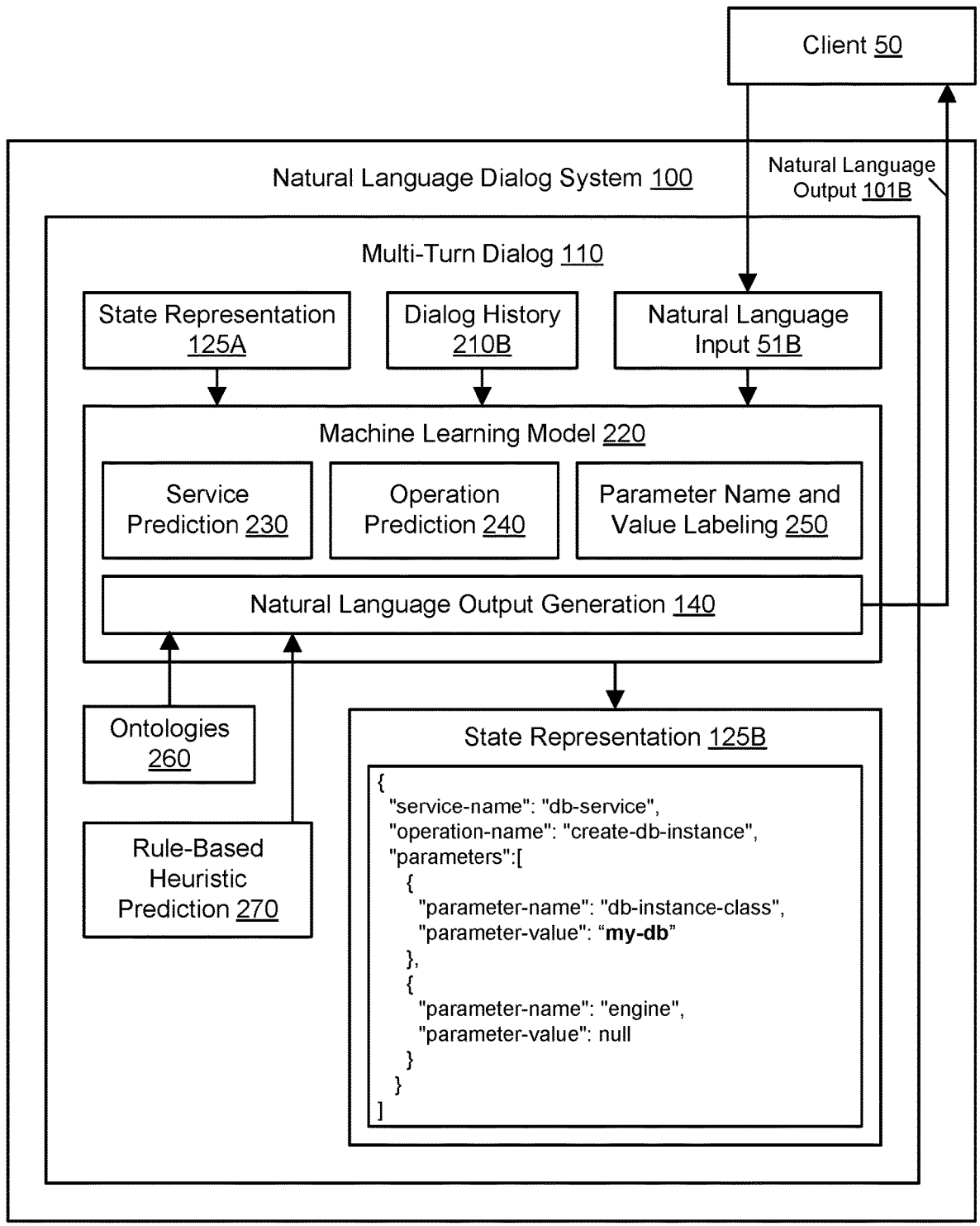

As shown in FIG. 3B, in the next turn in the dialog 110, the client 50 may respond to the natural language output 101A with natural language input 51B. The natural language input 51B may state: "You can use my-db." A dialog history 210B for this dialog 110 may now include prior natural language inputs such as input 51A. Based (at least in part) on the state representation 125A, the natural language input 51B, and potentially on any dialog history 210B, the machine learning model 220 may use parameter name and value labeling 250 to identify "my-db" as the parameter value for the parameter name "db-instance class." The machine learning model 220 may be used to update the state representation 125B for the desired command. As shown in the example of FIG. 3B, the updated state representation 125B may continue to indicate the service name ("db-service"), the operation name ("create-db-instance"), and the parameter names ("db-instance-class" and "engine") for the operation. Based on automated analysis of the natural language input 51B along with the prior state representation 125A and the dialog history 210B, the machine learning model 220 may update the state representation to include the value "my-db" for the parameter name "db-instance-class." One or more additional turns may be used to obtain any other parameter values. To obtain the additional parameter values, the natural language output generation 140 may generate a natural language output 101B that represents an acknowledgement of the previous input 51B and also a solicitation of another parameter value. For example, the natural language output 101B may state: "OK. And what engine?"

Figure 3C:
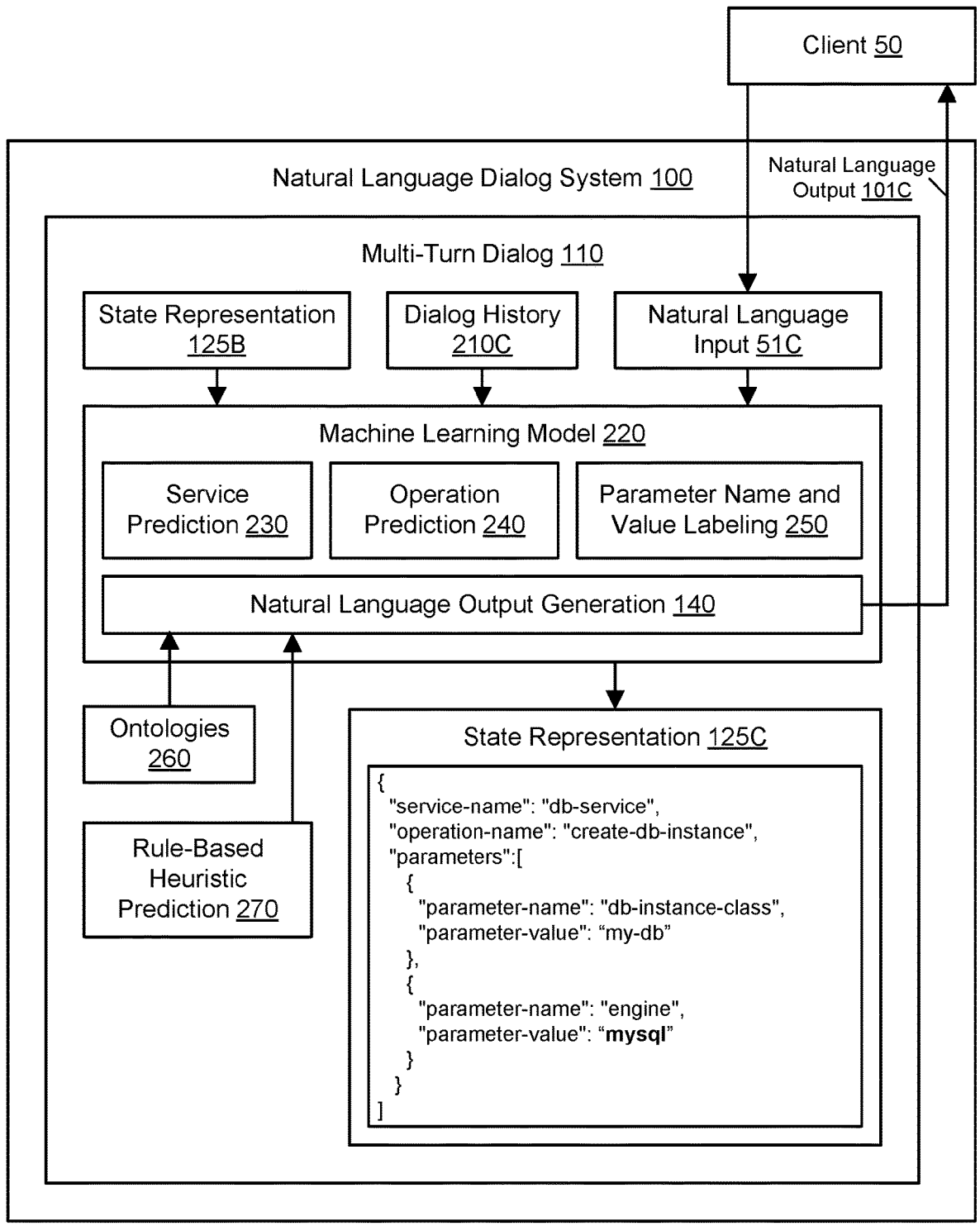

As shown in FIG. 3C, in the next turn in the dialog 110, the client 50 may respond to the natural language output 101B with natural language input 51C. The natural language input 51C may state: "In mysql." A dialog history 210C for this dialog 110 may now include prior natural language inputs such as input 51A and input 51B. Based (at least in part) on the state representation 125B, the natural language input 51C, and potentially on any dialog history 210C, the machine learning model 220 may use parameter name and value labeling 250 to identify "mysql" as the parameter value for the parameter name "engine." The machine learning model 220 may be used to update the state representation 125C for the desired command. As shown in the example of FIG. 3C, the updated state representation 125C may continue to indicate the service name ("db-service"), the operation name ("create-db-instance"), and the parameter names ("db-instance-class" and "engine") for the operation, along with the previously determined parameter value. Based on automated analysis of the natural language input 51C along with the prior state representation 125B and the dialog history 210C, the machine learning model 220 may update the state representation to include the value "mysql" for the parameter name "engine." As will be discussed with respect to FIG. 3D, the dialog system 100 may generate a command using the state representation 125C and may submit that command to the identified service. To complete the final turn in the multi-turn dialog 110, the natural language output generation 140 may generate a natural language output 101C that represents an acknowledgement of the previous input 51C and/or the successful operation. For example, the natural language output 101C may state: "OK. I've successfully created an instance for you."

Figure 3D:
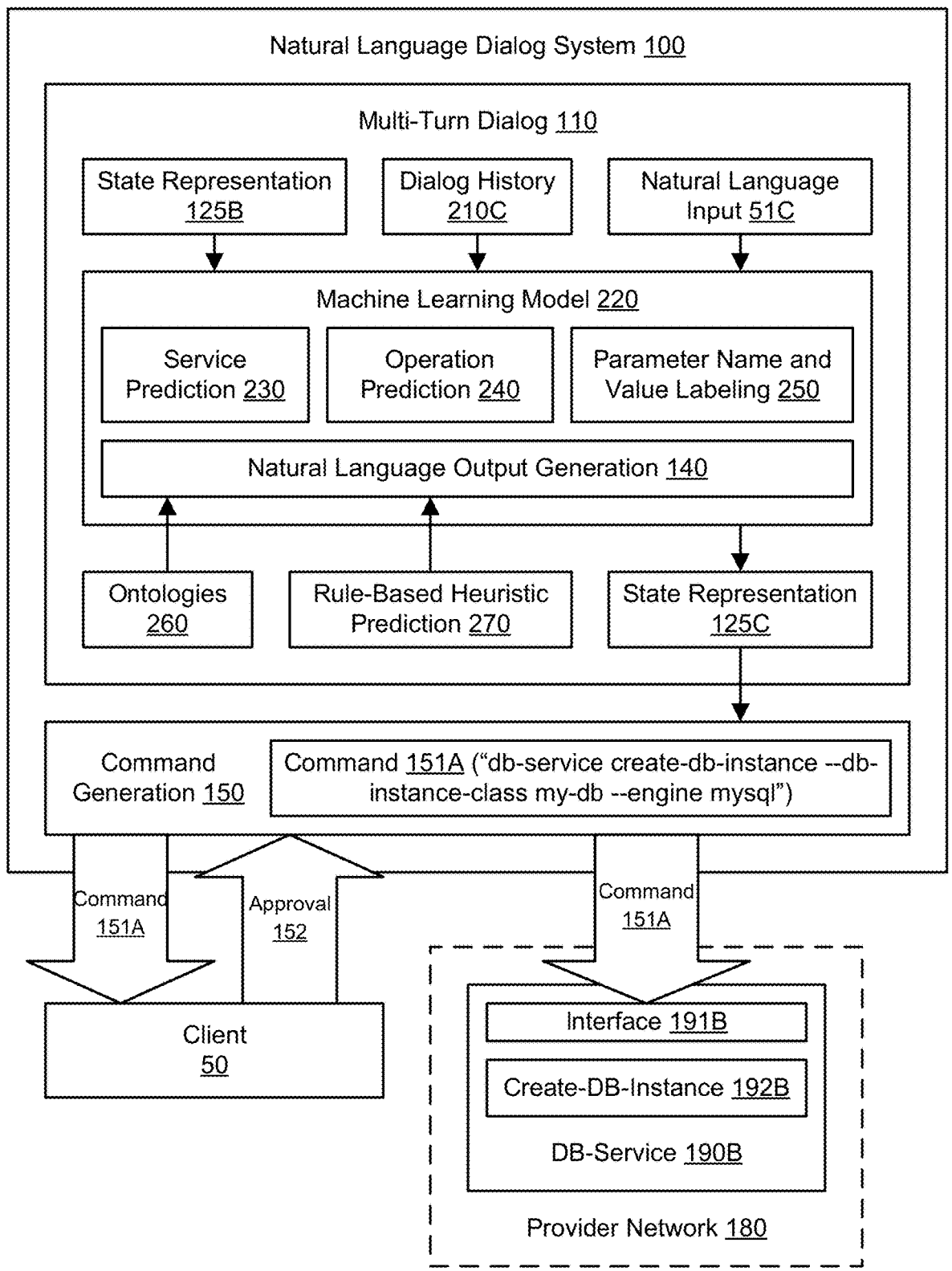

As shown in FIG. 3D, the command generation component 150 may generate a command 151A based (at least in part) on the latest state representation 125C. The command 151A may be expressed not in a natural language but in structured language, artificial language, and/or computer language that can be used to control the operation of a computer system. For example, the command 151A may state: "db-service create-db-instance-db-instance-class my-db-engine mysql." The command 151A may be provided to the db-service 190B via an interface 191B (e.g., a CLI or API). Responsive to the command 151A, the service 190B may perform (or attempt to perform) the create-db-instance operation 192B using the specified parameter values. The service 190B may return an acknowledgement of successful database instance creation to the dialog system 100. In some embodiments, the command 151A may be provided to the client 50, e.g., in a console or other user interface. In some embodiments, the command 151A may be executed only after approval 152 is received from the client 50. In some embodiments, the command 151A may be executed automatically and without necessarily being approved by the client 50 after command generation. For example, the client 50 may pre-approve one or more categories of commands for automated execution.

In some embodiments, the multi-turn dialog 110 may continue after building the command 151A. For example, if the user expressed a desire to create a security group that allows the client's virtual compute instances in the provider network to access the newly created database instance, then the dialog system 100 may solicit any follow-up information usable to automatically build any additional commands to meet the user's request(s). The continuation of the dialog 110 may take into account state information such as the existence and configuration of the newly created database, the existence and configuration of the virtual compute instances, and other aspects of the client's account with the provider network 180. In this manner, the dialog system 100 may maintain state information from turn to turn within a multi-turn dialog to automatically build a plurality of commands to accomplish complex tasks on behalf of a client.

Figure 4A:
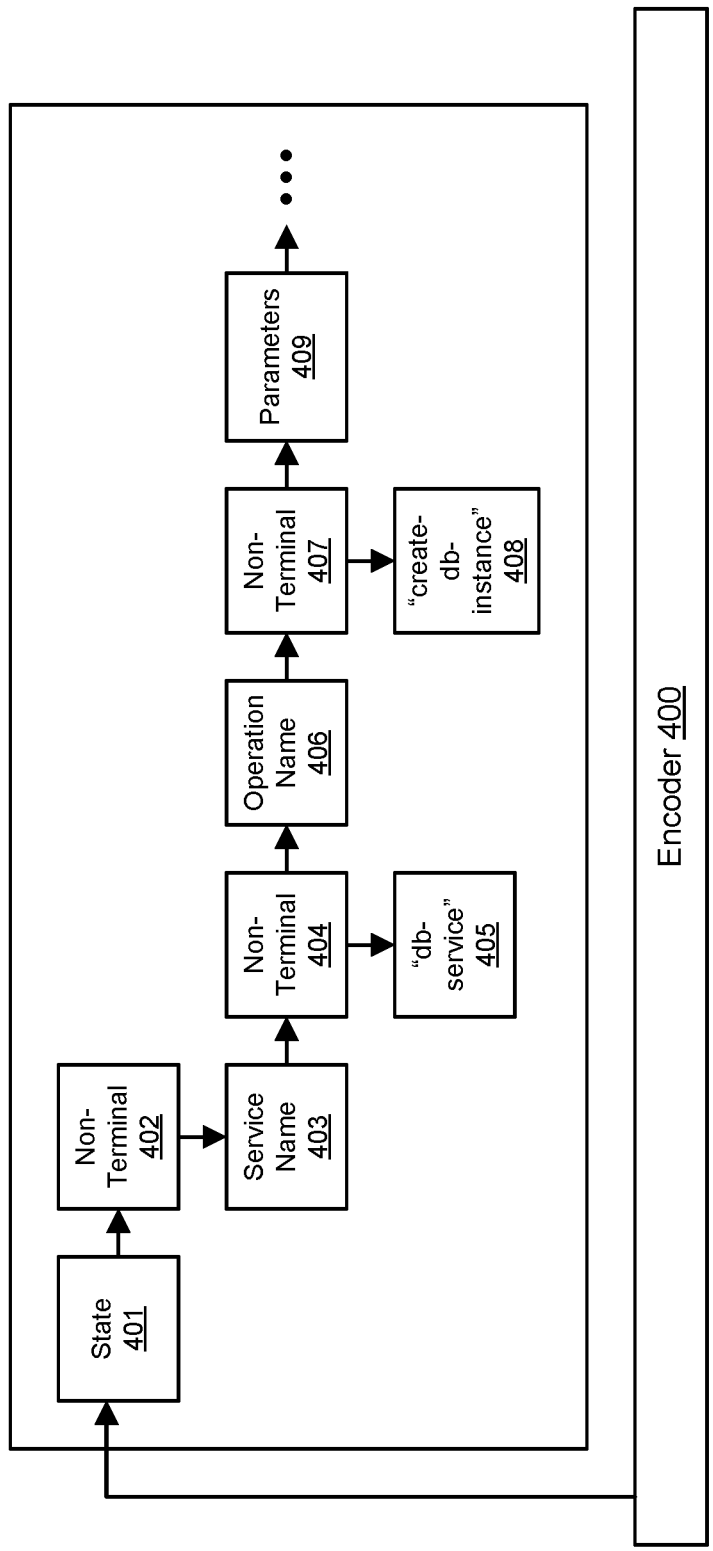
FIG. 4A, FIG. 4B, and FIG. 4C illustrate an example of a tree-based encoding of a state representation for interactive command generation for natural language input, according to some embodiments.
Figure 4B:
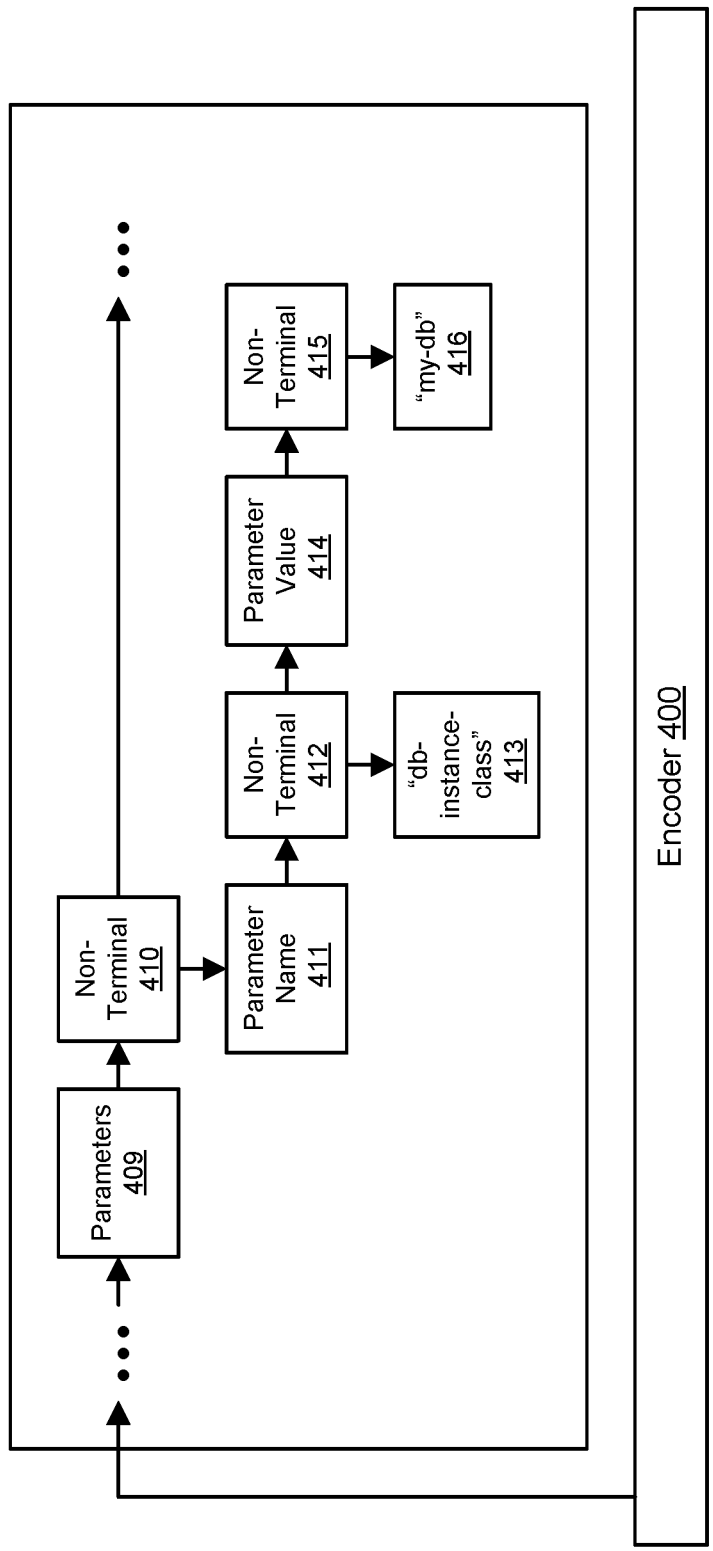
Figure 4C:
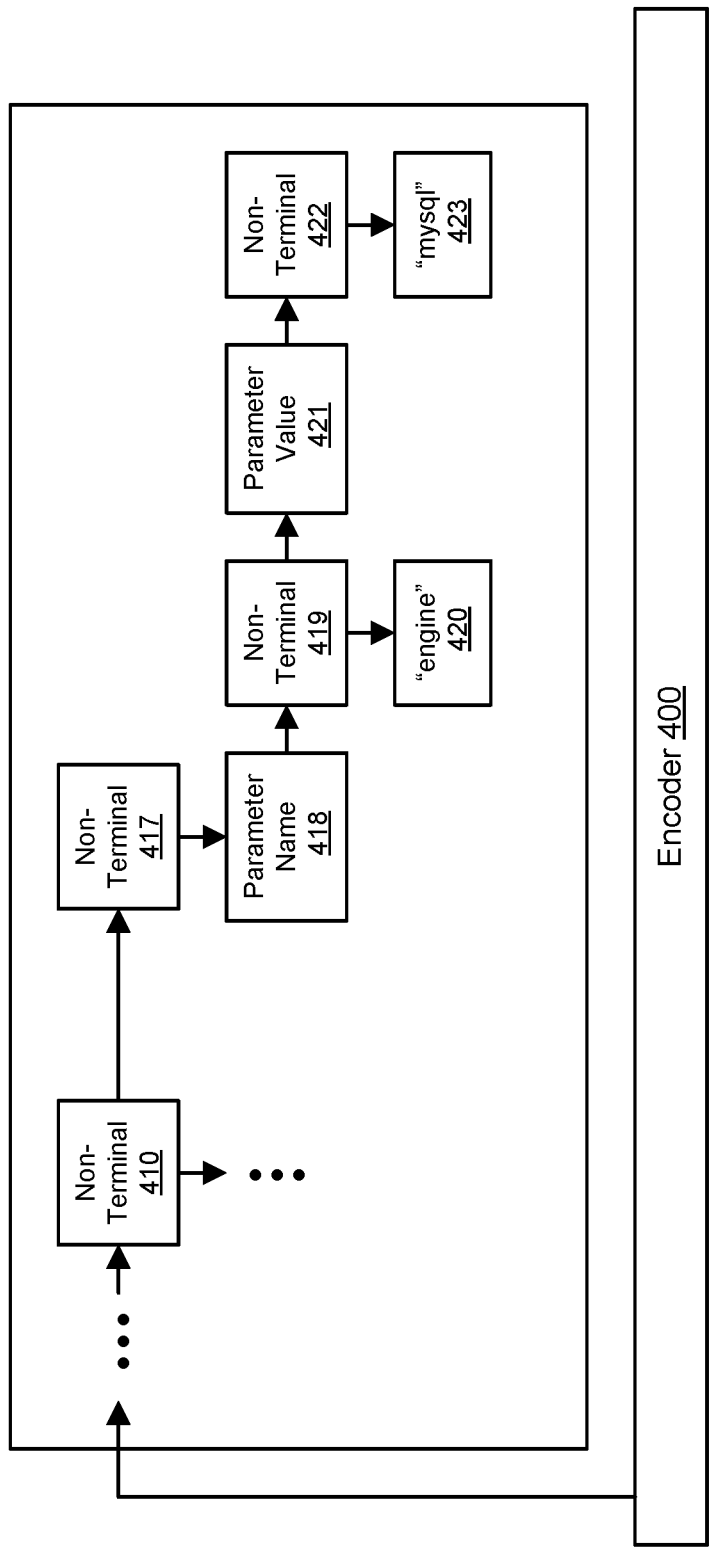

FIG. 4A, FIG. 4B, and FIG. 4C illustrate an example of a tree-based encoding of a state representation for interactive command generation for natural language input, according to some embodiments. The dialog system 100 may use a recursive, hierarchical frame-based representation that captures complex relationships between slot labels (e.g., parameters). This hierarchical frame-based representation may be derived from natural language inputs 51. Frame generation may be performed as a template-based tree decoding task. The value or positional information at each terminal in a template generated by the tree decoder may be predicted using a pointer to the tokens in the input sentence, such that parameters can be copied over directly from the input utterance. Local tree-based loss functions may be extended with terms for global supervision, and the system 100 may optimize jointly for loss functions end-to-end.

In some embodiments, one or more components such as an encoder 400 may produce a continuous vector representation based (at least in part) on state information and natural language input. The encoder 400 may obtain token embeddings which are fine-tuned during the end-to-end learning. The components may include a slot decoder that accepts embeddings from the encoder and has a dense final layer which predicts the slot label for each token position. The components may include a template-based tree decoder. The template-based tree decoder may learn to predict Begin-Inside-Outside (BIO) tags to allow the tree decoder to focus on producing a tree form and to allow the slot decoder to perform boundary detection. The slot decoder may be trained to minimize a supervised loss. The template-based tree decoder may share the encoded representations with the slot decoder and output the hierarchical representation. In some embodiments, Long Short Term Memory (LSTM) models may be used to generate tokens. These components may generate a state representation for a command using a hierarchical or tree-based data structure. The hierarchical data structure may include a plurality of nodes. The nodes may represent neural network nodes that are associated with hidden representations.

As shown in FIG. 4A, a root of the hierarchical data structure may be a node representing the state 401. The state 401 may be linked to a non-terminal node 402. A non-terminal node may correspond to an open bracket and a closed bracket in the state representation, and the node may represent the need to complete the contents of the bracket. When the model encounters non-terminal node such as node 402, the non-terminal and its hidden representation may be placed in a queue. The non-terminal node 402 may be popped from the queue and may become the new parent node. Because the model has encountered a non-terminal, the model may continue to generate additional symbols or tokens at the next level, e.g., the children of the node 402. As shown in FIG. 4A, the data structure may then include a node 403 representing the service name and a non-terminal node 404 that can be completed with a child node 405 to identify "db-service" as the service name. The data structure may then include a node 406 representing the operation name and a non-terminal node 407 that can be completed with a child node 408 to identify "create-db-instance" as the operation name. The data structure may include another node 409 representing parameters of the operation.

As shown in FIG. 4B, from the parameters node 409, the data structure may then include a non-terminal node 410 whose child is a node representing the parameter name 411. The parameter name 411 is linked to a non-terminal node 412 that can be completed with a child node 413 to identify "db-instance-class" as the parameter name. The non-terminal 412 is linked to a node representing the parameter value 414. The parameter value 414 is linked to a non-terminal node 415 that can be completed with a child node 416 to identify "my-db" as the parameter value.

As shown in FIG. 4C, from the non-terminal node 410, the data structure may then include another non-terminal node 417 whose child is a node representing another parameter name 418. The parameter name 418 is linked to a non-terminal node 419 that can be completed with a child node 420 to identify "engine" as the parameter name. The non-terminal 419 is linked to a node representing the parameter value 421. The parameter value 421 is linked to a non-terminal node 422 that can be completed with a child node 423 to identify "mysql" as the parameter value.

At each root node or non-terminal node shown in FIGS. 4A-4C, a frame may be generated that represents the state. The children of the root (state) node 401 include the non-terminal node 402. The queue contents for the root node 401 are [non-terminal node 402]. The resulting frame is: state { }.

The children of non-terminal node 402 include nodes 403, 404, 406, 407, 409, 410, and 417. The queue contents for non-terminal node 402 are [non-terminal nodes 404, 407, 410, 417]. The resulting frame is: service_name { } operation_name { } parameters { } { }.

The children of non-terminal node 404 include node 405. The queue contents for non-terminal node 404 are [non-terminal nodes 407, 410, 417]. The resulting frame is: service_name {"db-service"} operation_name { } parameters { } { }.

The children of non-terminal node 407 include node 408. The queue contents for non-terminal node 407 are [non-terminal nodes 410, 417]. The resulting frame is: service_name {"db-service"} operation_name {"create-db-instance"} parameters { } { }.

The children of non-terminal node 410 include nodes 411, 412, 414, and 415. The queue contents for non-terminal node 410 are [non-terminal nodes 417, 412, 415]. The resulting frame is: service_name {"db-service"} operation_name {"create-db-instance"} parameters {parameter-name { } parameter-value { }} { }.

The children of non-terminal node 417 include nodes 418, 419, 421, and 422. The queue contents for non-terminal node 417 are [non-terminal nodes 412, 415, 419, 422]. The resulting frame is: service_name {"db-service"} operation_name {"create-db-instance"} parameters {parameter-name { } parameter-value { }} {parameter-name { } parameter-value { }}.

The children of non-terminal node 412 include node 413. The queue contents for non-terminal node 412 are [non-terminal nodes 415, 419, 422]. The resulting frame is: service_name {"db-service"} operation_name {"create-db-instance"} parameters {parameter-name {"db-instance-class"} parameter-value { }} {parameter-name { } parameter-value { }}.

The children of non-terminal node 415 include node 416. The queue contents for non-terminal node 415 are [non-terminal nodes 419, 422]. The resulting frame is: service_name {"db-service"} operation_name {"create-db-instance"} parameters {parameter-name {"db-instance-class"} parameter-value {"my-db"}} {parameter-name { } parameter-value { }}.

The children of non-terminal node 419 include node 420. The queue contents for non-terminal node 419 are [non-terminal node 422]. The resulting frame is: service_name {"db-service"} operation_name {"create-db-instance"} parameter-value {"my-db"}} parameters {parameter-name {"db-instance-class"} {parameter-name {"engine"} parameter-value { }}.

The children of non-terminal node 422 include node 423. The queue for non-terminal node 422 is empty. The resulting frame is: service_name {"db-service"} operation_name {"create-db-instance"} parameters {parameter-name {"db-instance-class"} parameter-value {"my-db"}} {parameter-name {"engine"} parameter-value {"mysql"}}. From this frame, the command 151A can be generated.

Figure 5A:
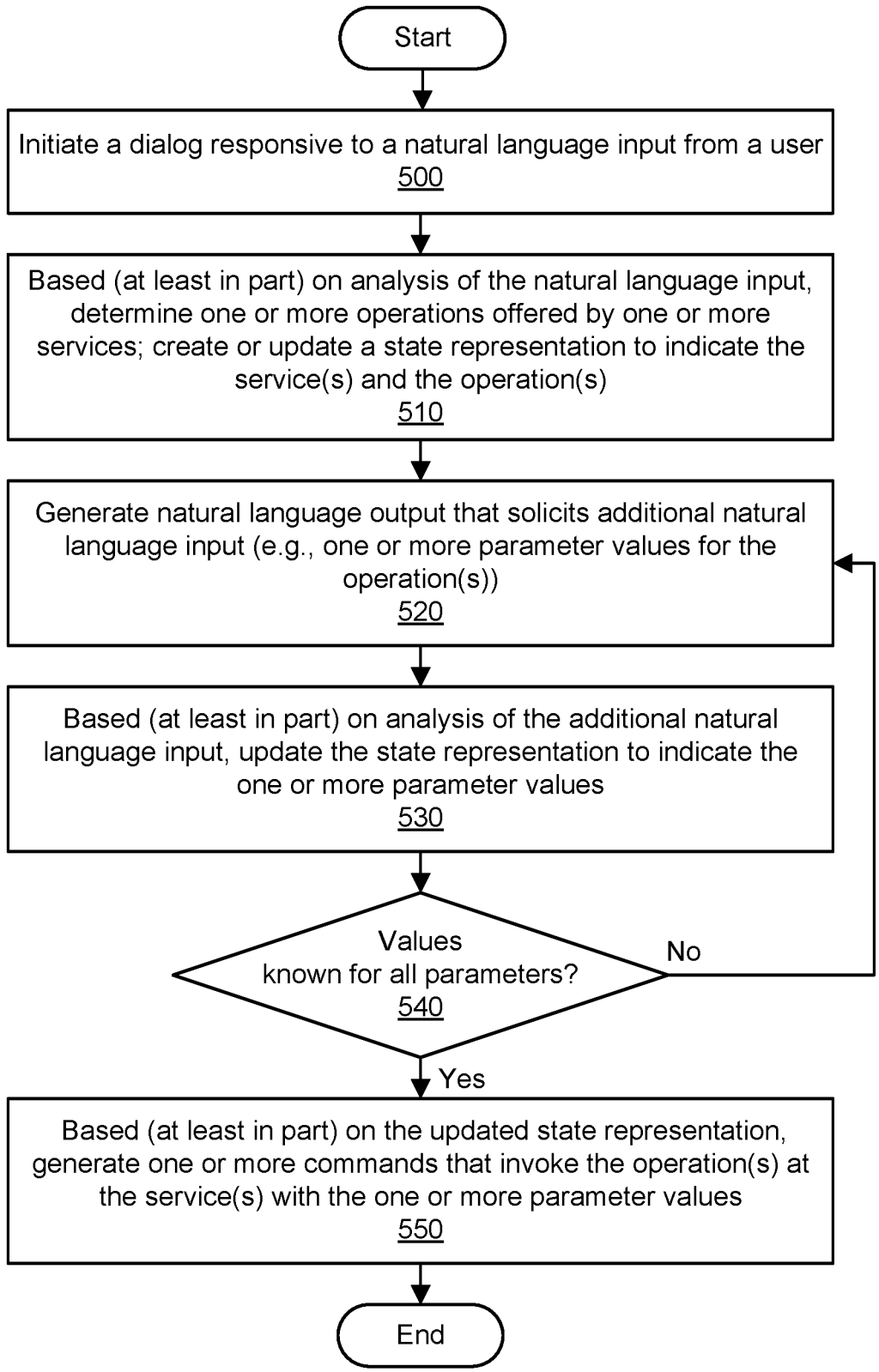
FIG. 5A and FIG. 5B are flowcharts illustrating methods for interactive command generation for natural language input, according to some embodiments.

FIG. 5A is a flowchart illustrating a method for interactive command generation for natural language input, according to some embodiments. As shown in 500, a dialog between a user and a natural language dialog system may be initiated. In some embodiments, when a user wants to perform one or more operations offered by services, in a provider network, the user may initiate a dialog with the dialog system. In some embodiments, the dialog system may initiate the dialog. A user may initiate the dialog by interacting with a user interface on a client device, e.g., by entering an initial natural language input to a chatbot or other automated system that uses natural language expressions for input and output. The dialog may accept such natural language inputs over a series of turns that take place at different points in time.

As shown in 510, based (at least in part) on automated analysis of the natural language input, the dialog system may determine one or more operations offered by one or more services in the provider network. The dialog system may update state information for the dialog, such as by creating or updating a state representation of the command to indicate the service(s) and the operation(s). The state representation may represent a structured form of the information required to generate a command for an identified operation. In some embodiments, the state representation may represent a tree-based format. In some embodiments, the service(s) and the operation(s) may be determined in different turns in the multi-turn dialog. In some embodiments, the service(s) and the operation(s) may be determined in the same turn in the multi-turn dialog. In some embodiments, the service(s) and the operation(s) may be determined based (at least in part) on other state information, such as a dialog history.

As shown in 520, the dialog system may generate natural language output based (at least in part) on the latest natural language input and on any state information for the dialog (e.g., the state representation and/or dialog history). The natural language output may represent a follow-up question, e.g., a solicitation of a parameter value for a specific parameter associated with the identified operation(s). The user may provide additional language input that represents a response to the natural language output. For example, the user may indicate a parameter value for a parameter name.

As shown in 530, based (at least in part) on automated analysis of the additional natural language input, the dialog system may determine one or more parameter values for one or more parameter names of the one or more operations previously identified. In some embodiments, the parameter value(s) may be determined based (at least in part) on other state information (e.g., the state representation and/or dialog history). The dialog system may also update state information for the dialog in the current turn, such as by updating the state representation of the command to indicate the parameter value(s).

As shown in 540, the dialog system may determine whether the values for all parameters are known. The dialog system may determine whether the values for all mandatory parameters are known. In some embodiments, the dialog system may also determine whether the values for optional parameters are known. The updated state representation may indicate what parameter values (if any) remain unknown at the end of the current turn. If not all the parameter values are known, then the method may proceed to the operation(s) shown in 520.

If all the parameter values are known, the as shown in 550, the dialog system may generate one or more commands that request or invoke the operation(s) at the service(s) with the specified parameter value(s). The command(s) may be generated automatically based (at least in part) on the updated state representation. The command(s) may be expressed in a formal and/or structured manner that is expected by a CLI or API of the services(s). After being submitted via the CLI or API, the command(s) may be performed by the service(s), e.g., to instantiate one or more cloud-based resources in the provider network or modify the configurations of such resources.

Figure 5B:
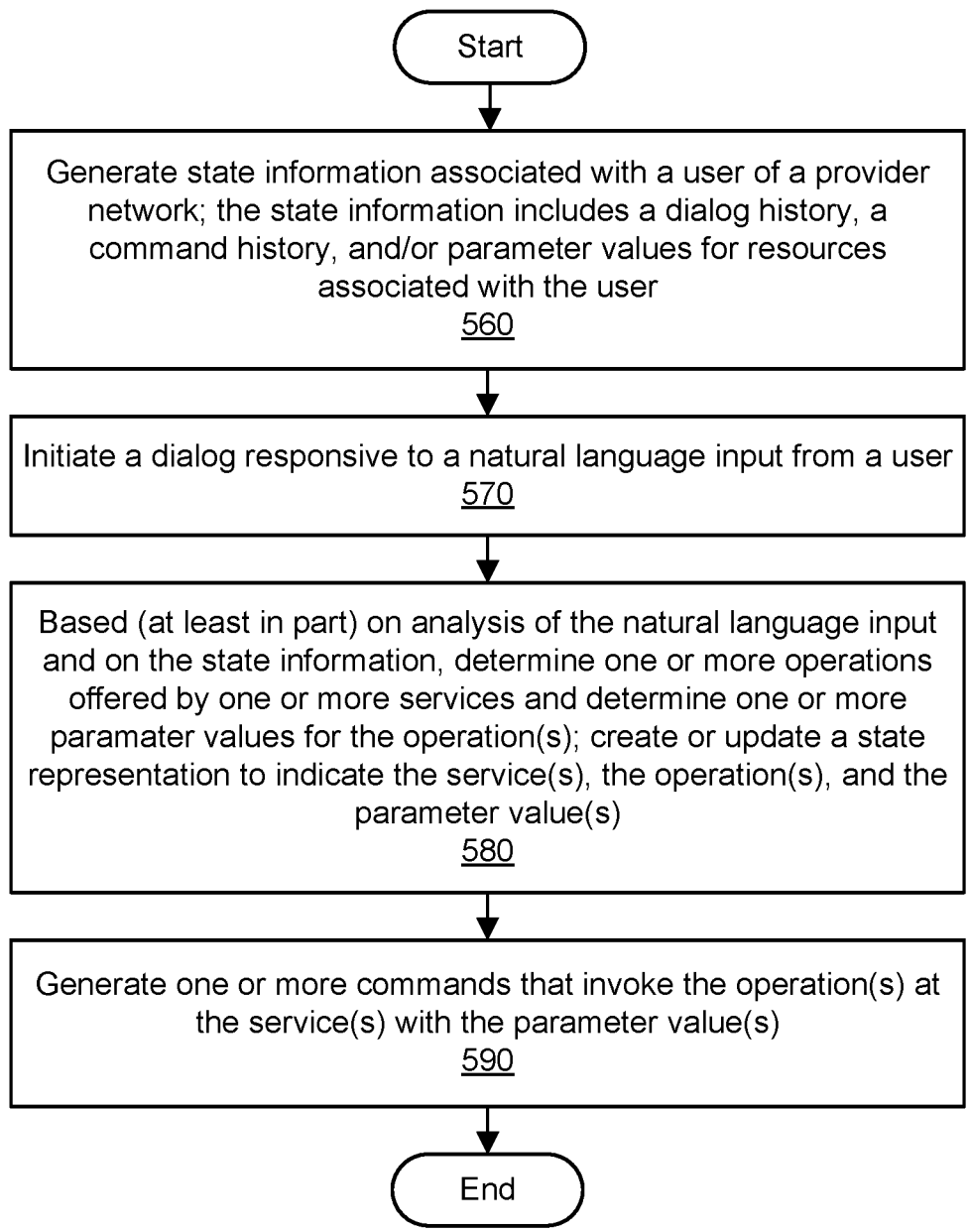

FIG. 5B is a flowchart illustrating a method for interactive command generation for natural language input, according to some embodiments. As shown in 560, state information for a client may be generated. The dialog system may maintain state information that reflects a previous interaction or set of interactions with the client and/or other knowledge of the client's resources in the provider network. The state information may include one or more natural language inputs from a prior dialog with the client, one or more natural language outputs from a prior dialog, one or more previously generated commands, one or more parameter values of the client's resources, other conditions in the provider network, and so on.

As shown in 570, a dialog between a user and a natural language dialog system may be initiated. In some embodiments, when a user wants to perform one or more operations offered by services, in a provider network, the user may initiate a dialog with the dialog system. In some embodiments, the dialog system may initiate the dialog. A user may initiate the dialog by interacting with a user interface on a client device, e.g., by entering an initial natural language input to a chatbot or other automated system that uses natural language expressions for input and output. The dialog may accept such natural language inputs over a series of turns that take place at different points in time.

As shown in 580, based (at least in part) on automated analysis of the natural language input and the state information, the dialog system may determine one or more operations offered by one or more services in the provider network and one or more parameter values for the one or more operations. For example, after a natural language input that requests a particular operation at a particular service, the dialog system may derive parameter values for the command from the state information rather than soliciting the values from the client using a natural language output. The dialog system may rely on the state information to complete a template associated with the desired command. As discussed above, the dialog system may complete the command using a state representation of the command that represents a hierarchical structure of the command and its parameters. In some embodiments, the dialog system may generate a natural language output that confirms the operation name and one or more of the parameter values derived from the state information. The dialog system may update state information for the dialog. Updating the state information may include creating and/or updating a state representation of the command to indicate the service(s), the operation(s), and the parameter value(s). The state representation may represent a structured form of the information required to generate a command for an identified operation. Updating the state information may include updating a dialog history for the client. Updating the state information may include updating the system's knowledge of the client's resources and their parameters.

As shown in 590, based (at least in part) on the analysis of natural language input and the state information associated with the client, the natural language dialog system may generate one or more commands with one or more parameter values. The command(s) may be expressed in a formal and/or structured manner that is expected by a CLI or API of the services(s). After being submitted via the CLI or API, the command(s) may be performed by the service(s), e.g., to instantiate one or more cloud-based resources in the provider network or modify the configurations of such resources.

Illustrative Computer System

In at least some embodiments, a computer system that implements a portion or all of one or more of the technologies described herein may include a computer system that includes or is configured to access one or more computer-readable media. FIG. 6 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 6 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
 a provider network comprising a plurality of services, wherein the plurality of services comprise a plurality of interfaces associated with a plurality of operations offered by the plurality of services; and
 a natural language dialog system comprising one or more processors and one or more memories to store computer-executable instructions that, when executed, cause the one or more processors to:
  receive a first natural language input associated with a dialog between a user and the natural language dialog system;
  determine a particular operation of a command-line interface for a particular service of the plurality of services based at least in part on analysis of the first natural language input;
  based at least in part on the first natural language input, generate a first state representation of the dialog indicating the particular service and the particular operation;
  generate a first natural language output based at least in part on the first natural language input, wherein the first natural language output solicits a second natural language input associated with the dialog;
  receive the second natural language input;
  determine one or more parameter values for the particular operation of the command-line interface based at least in part on analysis of the second natural language input;
  based at least in part on the first state representation and the second natural language input, generate a second state representation of the dialog indicating the particular service, the particular operation, and the one or more parameter values; and
  generate a command, of the command-line interface of the service, invoking the particular operation of the particular service with the one or more parameter values, wherein the command is generated based at least in part on the second state representation.

2. The system as recited in claim 1, wherein the one or more memories store additional computer-executable instructions that, when executed, cause the one or more processors to:
 generate a second natural language output based at least in part on the second natural language input, wherein the second natural language output solicits a third natural language input associated with the dialog;
 receive the third natural language input;
 determine an additional one or more parameter values of the particular operation based at least in part on analysis of the third natural language input; and
 based at least in part on the second state representation and the third natural language input, generate a third state representation of the dialog indicating the particular service, the particular operation, the one or more parameter values, and the additional one or more parameter values, wherein the command is generated based at least in part on the third state representation.

3. The system as recited in claim 1, wherein the one or more memories store additional computer-executable instructions that, when executed, cause the one or more processors to:
 send the command to the particular service using an interface of the particular service, wherein the particular operation is performed by the particular service with the one or more parameter values responsive to the command.

4. The system as recited in claim 1, wherein the first state representation and the second state representation comprise one or more hierarchical data structures.

5. A method, comprising:
 receiving, by a natural language dialog system, a plurality of natural language inputs associated with a dialog with a user;
 maintaining, by the natural language dialog system based at least in part on individual ones of the natural language inputs, a state representation of the dialog, wherein the state representation indicates one or more services of a plurality of services of a provider network and one or more operations offered by the one or more services that are accessible via a command-line interface;
 generating, by the natural language dialog system, one or more natural language outputs associated with the dialog and that solicit additional natural language input comprising one or more parameter values for the one or more operations, wherein the one or more natural language outputs are generated based at least in part on the state representation, and wherein an individual one of the natural language outputs is generated based at least in part on an individual one of the natural language inputs;

updating, by the natural language dialog system based at least in part on the additional nature language input, the state representation to indicate the one or more parameter values; and generating, by the natural language dialog system based at least in part on the updated state representation indicating the one or more parameter values, one or more commands including the one or more parameter values for the command-line interface of the one or more services requesting the one or more operations offered by the one or more services.

6. The method as recited in claim 5, wherein the state representation is updated based at least in part on the individual ones of the natural language inputs to indicate the one or more parameter values of the one or more operations.

7. The method as recited in claim 5, further comprising:
determining, by the natural language dialog system based at least in part on a first natural language input of the plurality of natural language inputs, the one or more operations; and
determining, by the natural language dialog system based at least in part on a second natural language input of the plurality of natural language inputs, the one or more parameter values for the one or more operations, wherein the second natural language input is solicited using a first natural language output of the one or more natural language outputs; and
wherein the state representation is updated based at least in part on the second natural language input to indicate the one or more parameter values.

8. The method as recited in claim 5, further comprising:
sending the one or more commands to the one or more services, wherein the one or more operations are performed by the one or more services responsive to the one or more commands.

9. The method as recited in claim 5, wherein the one or more natural language outputs are generated using one or more ontologies associated with the one or more services.

10. The method as recited in claim 5, wherein the state representation is updated based at least in part on a dialog history, wherein the dialog history comprises one or more of the natural language inputs.

11. The method as recited in claim 5, further comprising:
determining, by the natural language dialog system, the one or more services and the one or more operations using one or more machine learning techniques based at least in part on the plurality of natural language inputs.

12. The method as recited in claim 5, wherein the state representation comprises a hierarchical data structure.

13. The method as recited in claim 5, wherein the one or more natural language outputs are generated using one or more machine learning techniques.

14. One or more non-transitory computer-readable storage media storing program instructions that, when executed on or across one or more processors, perform:
generating state information associated with one or more resources in a provider network;
receiving one or more natural language inputs in a dialog with a client, wherein at least one of the natural language inputs indicates one or more parameter values;
selecting, by a dialog system and based at least in part on processing one or more of the natural language inputs using a service prediction feature of a machine learning model, one or more services from [of] a plurality of services of the provider network to access via operations offered by the one or more services, wherein the plurality of services are distinct from the dialog system;
determining, by the dialog system and based at least in part on one or more of the natural language inputs, one or more operations offered by the one or more services determined using the service prediction feature of the machine learning model, wherein the one or more operations offered by the determined one or more services is accessible via a command-line interface; and
generating one or more commands for the command-line interface requesting the one or more operations offered by the one or more services with the one or more parameter values indicated via the natural language inputs.

15. The one or more non-transitory computer-readable storage media as recited in claim 14, further comprising additional program instructions that, when executed on or across the one or more processors, perform:
sending the one or more commands to the one or more services using one or more interfaces of the one or more services, wherein the one or more operations are performed by the one or more services with the one or more parameter values responsive to the one or more commands.

16. The one or more non-transitory computer-readable storage media as recited in claim 14, wherein the one or more resources are managed by the provider network on behalf of the client, and wherein the state information comprises one or more parameter values for the one or more resources.

17. The one or more non-transitory computer-readable storage media as recited in claim 14, wherein the state information comprises one or more prior natural language inputs from the client.

18. The one or more non-transitory computer-readable storage media as recited in claim 14, wherein the state information comprises one or more prior commands generated for the client based at least in part on one or more prior natural language inputs.

19. The one or more non-transitory computer-readable storage media as recited in claim 14, further comprising additional program instructions that, when executed on or across the one or more processors, perform:
generating one or more natural language outputs associated with the dialog, wherein the one or more natural language outputs are generated based at least in part on the one or more natural language inputs and the state information.

20. The one or more non-transitory computer-readable storage media as recited in claim 14, wherein the one or more commands are generated using a hierarchical data structure.

* * * * *